Feb. 17, 1970 B. S. NIELSEN 3,495,905

APPARATUS FOR MANUFACTURING OFFSET PRINTING PLATES BY THE METHOD OF DIFFUSION

Filed Sept. 11, 1967 2 Sheets-Sheet 1

Feb. 17, 1970 B. S. NIELSEN 3,495,905

APPARATUS FOR MANUFACTURING OFFSET PRINTING PLATES BY THE METHOD OF DIFFUSION

Filed Sept. 11, 1967 2 Sheets-Sheet 2

United States Patent Office 3,495,905
Patented Feb. 17, 1970

3,495,905
APPARATUS FOR MANUFACTURING OFFSET PRINTING PLATES BY THE METHOD OF DIFFUSION

Borge Simon Nielsen, Skolegade 19, Copenhagen Valby, Denmark
Filed Sept. 11, 1967, Ser. No. 666,684
Claims priority, application Germany, Sept. 9, 1966, N 19,135
Int. Cl. G03b 27/20
U.S. Cl. 355—91 3 Claims

ABSTRACT OF THE DISCLOSURE

Apparatus for manufacturing photocopies, more particularly offset printing plates, in which the exposed positive coated sheet and the negative coated sheet, in particular the offset printing plate, are passed separately through a developing bath and subsequently squeezed together in a pair of rollers. The exposure table constitutes an alignment table for the coated sheets which are abutted against an alignment rail along the front edge of the exposure table and where the sheets thus aligned are displaced in parallel sideways guided by the rail towards the developing bath. The developing bath is placed at the side of the exposure table with the feed slit of the bath being located along the side edge of the table.

BACKGROUND OF THE INVENTION

Figures 1, 3:
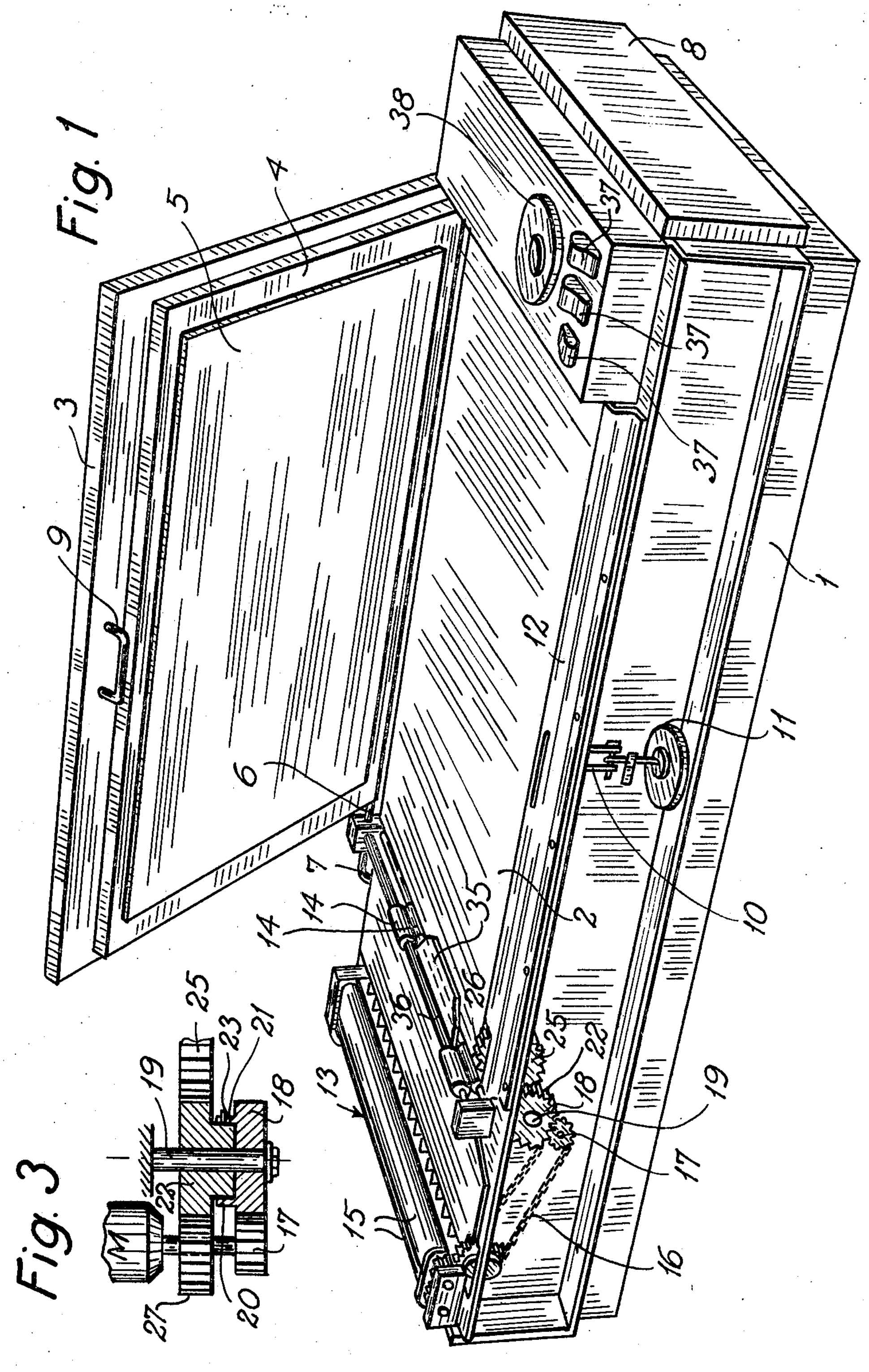

Apparatus of this type, that is, the combined type in which the exposure table and the developing bath constitute parts of a common unit, have hitherto been formed in such manner that the developing or copying bath is placed in front of the exposure table with the feeding slit for the coated sheets located in front of and parallel with the front edge of the exposure table. The different operations of the copying process are performed in independent steps with successive activation of the various members for releasing the different operations and with several consecutive handlings of the coated sheets. The known apparatus are therefore unsuitable for ready, quick and convenient operation.

SUMMARY OF THE INVENTION

The present invention relates to an apparatus for manufacturing photocopies, more particularly offset printing plates, by the method of diffusion, in which an original laid together with a negative coated sheet is exposed, the exposed sheet being subsequently laid together with a positive coated sheet or offset printing plate and together with, but spaced from the latter passed along guide channels through a copying bath to a pair of squeezing rollers, where an exposure table which is provided with a lid hinged to the rear edge of the apparatus simultaneously constitutes an alignment table for the said sheets, an alignment rail being provided along the front edge of the said table, against which rail the sheets may be abutted and along which they may be displaced in parallel laterally to the copying bath which is provided at one side of the exposure table and has feeding means extending along the side edge of the exposure table.

With this design the different operations may be performed in a continuous process which may be partly automatized. The operations of alignment, exposure and development may be performed substantially continously without great movement or removals of the coated sheets being necessary. The exposure and the alignment are performed on the same table which also serves to convey and guide the coated sheets from the place of exposure to the developing bath which is not in the way of the operation of the exposure table, and all the parts of the apparatus may be conveniently located within reach of the operator.

The exposure may be partly automatized if the arrangement is such that the lid has a locking device adapted to engage a vacuum-operated locking device of the apparatus, adapted to pull down the lid.

A partial automation of the entire copying process may be provided in an apparatus of the aforesaid type if it is fitted with an electric control system and the arrangement is such that after the lid is lowered to closed and a press-button is activated the following functions are effected in the sequence indicated: Activation of the locking device, evacuation of the hollow space between the lid and a rubber plate provided in the lid, switching on illuminants in the exposure table, switching off the said illuminants after a preset time interval, interruption of the vacuum with subsequent release of the locking device and opening of the lid by spring action.

Figure 2:
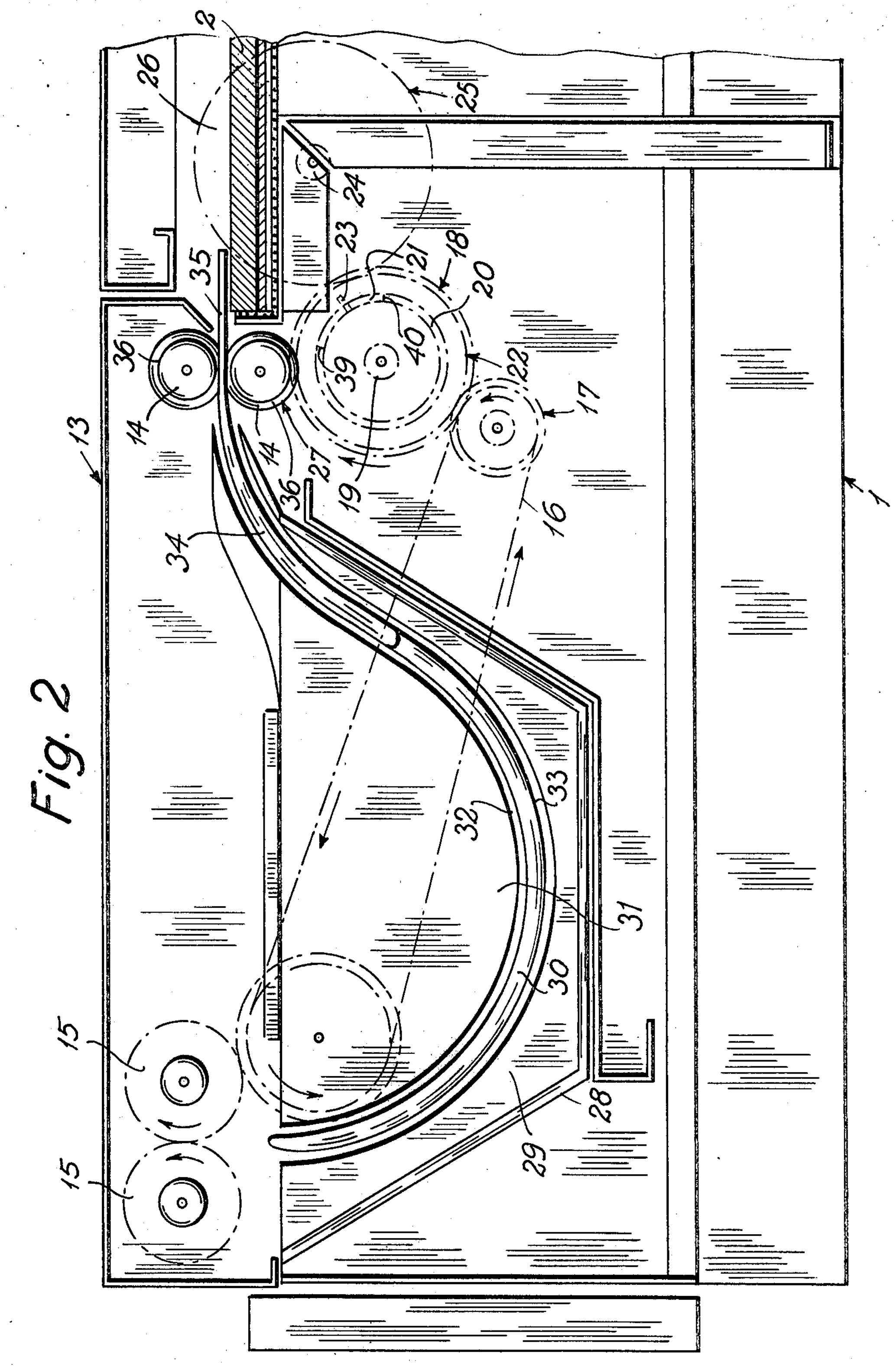

An embodiment of an apparatus according to the invention will now be described with reference to the drawing, in which FIGURE 1 is a perspective view of the apparatus, FIGURE 2 is a section through the left-hand end of the apparatus according to FIGURE 1, viewed from the side and on a larger sale, and FIGURE 3 is a diagrammatic representation of the driving mechanism, partly in section.

The apparatus comprises a box 1 with a working table 2 consisting of a frosted glass plate below which there are provided illuminators for the exposure of a negative coated sheet placed on the glass plate together with an original for exposing the sheet. During the exposure the sheets are retained by a lid 3 hinged along its rear edge to the box 1 and having a frame 4 of resilient rubber and a plate 5 of comparatively thin rubber glued to the frame. The space formed between the plate 5 and the lid 3 inside the frame 4 communicates with the outer atmosphere, whereas the space between the rubber plate 5 and the glass plate communicates through a pipe 6, which simultaneously constitutes the hinge joint of the lid, and a tubing 7 with an electrically driven vacuum pump mounted in a part 8 of the box.

By evacuation of the said hollow space it will be possible to provide a heavy pressure on the sheets placed on the glass plate 2 when the lid is closed upon the glass plate, the pressure being the differential pressure between the pressure exerted by the outer atmosphere and the vacuum in the hollow space. Exact copies are thereby obtained.

The lid 3 may be held in position against the glass plate 2 by means of a clamp 9 engaging a swingable hook which is mounted on a toggle joint 10 connected with a membrane servomotor 11, which also communicates with the vacuum pump and is adapted to pull the hook and consequently the clamp 9 down so as to hold the lid and the plate 5 firmly pressed against the glass plate 2.

A rail 12 mounted along the front edge of the glass plate 2 serves as an alignment rail for the sheets when the diffusion copying is to take place. As is known, the negative coated sheet, after being subjected to exposure, is laid together with the positive sheet, which, for example, may be an offset printing plate, and is passed through a diffusion bath. To provide ready and prompt alignment of the two sheets in relation to each other, their longitudinal edges may be abutted against the rail 12 so as to provide immediate, exact transverse alignment.

The diffusion bath is placed on the side of the glass plate 2 and is denoted by 13 as a whole. The diffusion bath treatment is fully automatic in operation and provided with a pair of feed rollers 14 extending transversely of the longitudinal direction of the apparatus, which affords a very convenient operation of the apparatus. When the lid 3 is opened after the exposure, the negative sheet may, as mentioned, be laid together with the positive sheet and be abutted against the rail 12, the two sheets being subsequently passed to the left (FIGURE 1) to the pair of feed rollers 14.

The diffusion bath 13 has, in addition to the feed roller pair 14, a pair of squeezing rollers 15 which are parallel with the roller pair 14 and driven together with same by means of a chain or belt 16 passed over a drive wheel 17, which is connected with an electromotor (not shown), for example the same motor driving the aforesaid vacuum pump. The drive wheel 17 as in mesh with a gearwheel 18 freely mounted on a shaft 19 fixed in the box 1 and provided with an inwardly facing, tubular extension 20 (FIGURES 2 and 3), in which there is a slit 21. The tubular extension is mounted on a collar of a gearwheel 22 lying therebehind and likewise freely rotatable on the shaft 19. The said collar has a radial driving stud 23 located in the slit 21. The gearwheels 18 and 22 are thus movably connected with each other, the connection having a backlash corresponding to the length of the slit 21. The slit has the form of a cutting which is open towards the apparatus to permit easy withdrawal and replacement of the gearwheel 18 by another gearwheel with a slit 21 of different length so as to provide a longer or shorter backlash.

The gearwheel 22 is in mesh with a gearwheel 25 freely rotatable on a permanent shaft 24. The upper part 26 of the said gearwheel 25 projects up through the rail 12 and may thus be acted upon manually. The gearwheel 22 is further in mesh with a gearwheel 27 mounted on the shaft of the lower roller 14.

The diffusion bath consists of a liquid trough 28 with developing and diffusion liquid. In the trough are mounted guide means in the form of vertical plates 29, 30 and 31, arranged behind each other if viewed as in FIGURE 2. The said plates form in combination two curved guide channels 32 and 33 which, from the entry side of the trough at the right lead down into the bath and to the left upwards towards the squeezing roller pair 15. At the entry side the plates 30 are connected with a plate 34 extending throughout the width of the trough and having an extension upwards and to the right to form a horizontal tongue 35 projecting between the rollers 14 in a turned-down neck 36 provided on same.

The apparatus is operated in the following manner: An unexposed, negative coated sheet is laid together with an original aligned in relation to the coated sheet in such manner that the letter image is correctly positioned at a predetermined location of the said sheet. The two sheets laid together are then placed on the glass plate 2, and the lid 3 is lowered so that the plate 5 is caused to rest on the glass plate, the lid being retained at a slight pressure against the said glass plate, after which a pressbutton 37 is activated. This will start the vacuum pump, and the servomotor is actuated so that the hook (not shown) is caused to engage the clamp 9, pulling it downwards, by which the plate 5 is pressed firmly against the glass plate 2. At the same time the hollow space between the plate 5 and the glass plate is evacuated, by which the aforesaid intimate contact between the sheets is provided.

The apparatus is now adapted in such manner that the illuminants are switched on automatically and remain lighted for an interval corresponding to an exposure time preset on a clock 38. Upon completion of the exposure, the vacuum is automatically terminated, so that the clamp 9 is released and the lid 3 tilts back by spring action into the open position indicated in FIGURE 1. At the same time atmospheric air is admitted into the space above the glass plate.

After exposure, the original is removed, and the negative sheet is laid together with a positive sheet, for example an offset printing plate consisting of an aluminum plate of substantial length in view of its arrangement in the offset printing machine, and it would be irrational to produce the negative sheet of a corresponding superfluous length, wherefore coated sheets of substantially shorter length are used so that it is necessary to align the two sheets in relation to each other, which must be done with very great accuracy since the image to be transferred has to be exactly and correctly positioned on the printing plate because it is impossible or very difficult to make an adjustment of the printing machine.

In the apparatus according to the invention, the necessary longitudinal displacement of the two sheets in relation to each other involves, however, no difficulty, the requisite lead of the positive sheet being provided in the following simple manner:

The positive sheet or the offset printing plate, respectively, is passed towards the roller pair 14, continually guided by the rail 12 and is brought into contact with these rollers beneath the dividing plate or the tongue 35. In the starting position the driving stud 23 is located in contact with the left-hand end wall 39 of the slit 21. The gearwheel 25 is now, owing to activation of the part 26, turned in counter-clockwise direction, as a result of which the gearwheel 22 turns in clockwise direction, the stud 23 moving through the slit 21 until stopped by striking the right-hand end surface 40 of the slit. Since the gearwheel 18 carrying the slit is in mesh with the driving wheel 17 which is blocked, there is no possibility of further movement. The gearwheel 22 is furthermore driving the gearwheel 27 and consequently the pair of rollers 14, by which the positive sheet or the offset printing plate, respectively, is passed to the left in FIGURE 2 as much as corresponds to the length of the slit 21 and is retained there.

The negative sheet is subsequently passed above the plate 35 and brought into contact with the rollers 14, and the apparatus is now in its starting position in which the positive sheet has a lead corresponding to the length of the slit 21. The driving motor is now started by activation of pushbutton 37, and the driving wheel 17 will then cause the roller pair 15 to rotate and likewise rotate the gearwheel 18 which will at first rotate as much as corresponds to the length of the slit, after which the end surface 39 will press against the stud 23 and turn the gearwheel 22 carrying same. As a result, the gearwheel 25, the gearwheel 27 and consequently the rollers 14 are caused to rotate. By means of the rollers 14 the two sheets are now passed down through the guide channels 32 and 33 and through the bath up to the squeezing rollers 15 which pass the sheets out of the apparatus.

Owing to the height of the guide channels 32 and 33 being reduced as much as possible, random displacements of the two sheets in relation to each other will be practically eliminated, and the displacement inevitably arising because the guide channels are placed above each other is compensated by the design of the slit 21. The aforesaid backlash, which is provided by means of the stud 23 and the slit 21, and which gives the positive sheet a predetermined lead in relation to the negative sheet, affords compensation both for the said displacement that is determined by the design of the apparatus and for the desired distance betwen the leading edge of the positive sheet and the leading edge of the negative sheet. Variations in the said lead is provided by replacing the gearwheel 18 withm the slit 21 by another gearwheel having a slit of a different length.

As will appear from the foregoing specification, the apparatus is, owing to the arrangement of its individual components and its design, very convenient and easy to operate, and a perfectly exact location of the printed image is obtainable, even with operation by an unskilled staff and without special care. Thus, a saving in time and material alike is obtained, the number of unsatisfactory copies being reduced to a minimum.

I claim:

1. Apparatus for making offset printing plates, by the diffusion transfer process, said apparatus comprising an exposure table having means therein for illuminating a negative coated sheet with an original placed on said table, said table having front, rear and side edges, a developing bath means adjacent the exposure table at one of the side edges thereof and including guide channels and a pair of squeezing rollers, a lid hingeably attached to the exposure table at the rear edge thereof, an alignment rail arranged along the exposure table at the front edge thereof and feed rollers extending perpendicularly to the alignment rail between the exposure table and the developing bath means for conveying an exposed negative sheet together with a positive sheet resting on said table through said guide channels to said squeezing rollers, said squezing rollers being parallel to the feed rollers and located on a side of the developing bath means opposite the feed rollers, said guide channels extending between the feed rollers and the squeezing rollers for guiding the exposed negative sheet together with the positive sheet to the squeeze rollers.

2. Apparatus as claimed in claim 1 wherein an offset positive printing plate and a negative sheet thereabove are placed on the exposure table after preliminary exposure of the negative sheet, said guide channels being curved and having a longer path for the positive plate compared to the path of the negative sheet from the feed rollers to the squeezing rollers, said apparatus further comprising means for advancing the positive plate with a preliminary advance of a pre-selected length before the plate and sheet are fed to the developing bath means whereby to compensate for the difference in length of the paths so that the plate and sheet arrive in alignment at the squeeze rollers.

3. Apparatus as claimed in claim 2 wherein said means for advancing the positive sheet with a preliminary advance comprises a gear unit engaging the feed rollers and having pin and slot means to turn the feed rollers a given distance to produce the preliminary advance of the positive sheet.

References Cited

UNITED STATES PATENTS

| | | | |
|---|---|---|---|
| 3,147,683 | 9/1964 | Hulen | 355—87 |
| 3,198,104 | 8/1965 | Koretz | 355—89 |

NORTON ANSHER, Primary Examiner

R. L. MOSES, Assistant Examiner

U.S. Cl. X.R.

95—89; 355—94